D. S. SEYMOUR.
CLUTCH DEVICE FOR POWER TRANSMITTERS.
APPLICATION FILED JAN. 25, 1911.

1,212,267.

Patented Jan. 16, 1917.
2 SHEETS—SHEET 1.

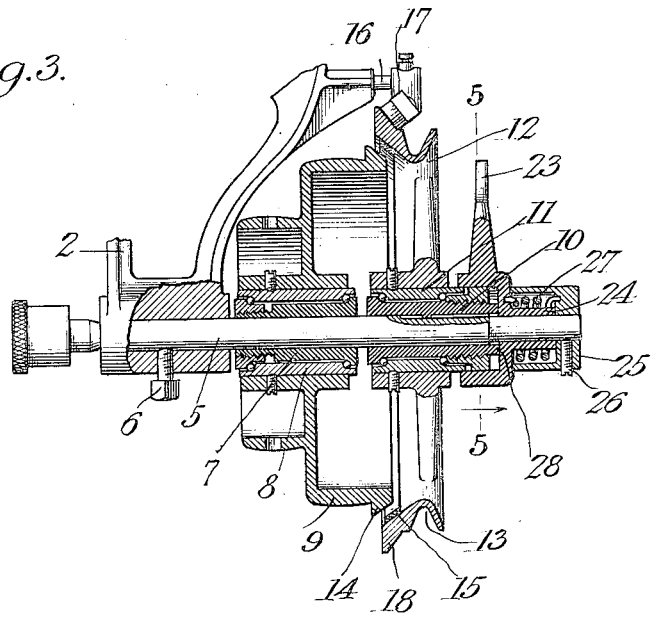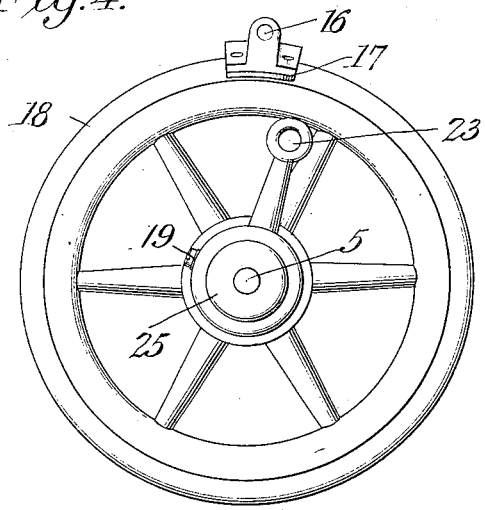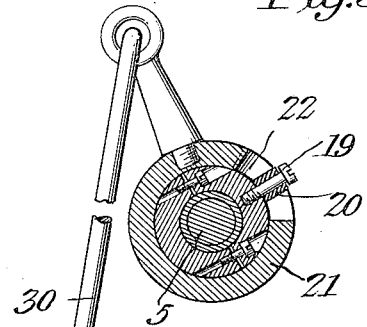

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

CLUTCH DEVICE FOR POWER-TRANSMITTERS.

1,212,267.          Specification of Letters Patent.      Patented Jan. 16, 1917.

Application filed January 25, 1911. Serial No. 604,572.

*To all whom it may concern:*

Be it known that I, DUDLEY S. SEYMOUR, a citizen of the United States, residing at Oak Park, in the county of Cook, State of Illinois, have invented certain new and useful Improvements in Clutch Devices for Power-Transmitters, of which the following is a description, reference being had to the accompanying drawing and to the letters and figures of reference marked thereon.

The invention relates to new and useful improvements in Clutches, and more especially clutches of the type wherein a driven member and a driving member are provided with coöperating friction surfaces, and one of said members is moved laterally, in order to bring said friction surfaces into driving contact.

An object of the invention is to provide a clutch wherein the movable member is positively moved laterally in both directions, so as to bring the friction surfaces into gripping contact, and to positively relieve said surfaces. This and other objects will in part be obvious, and will in part be hereinafter more fully described.

Figure 1:
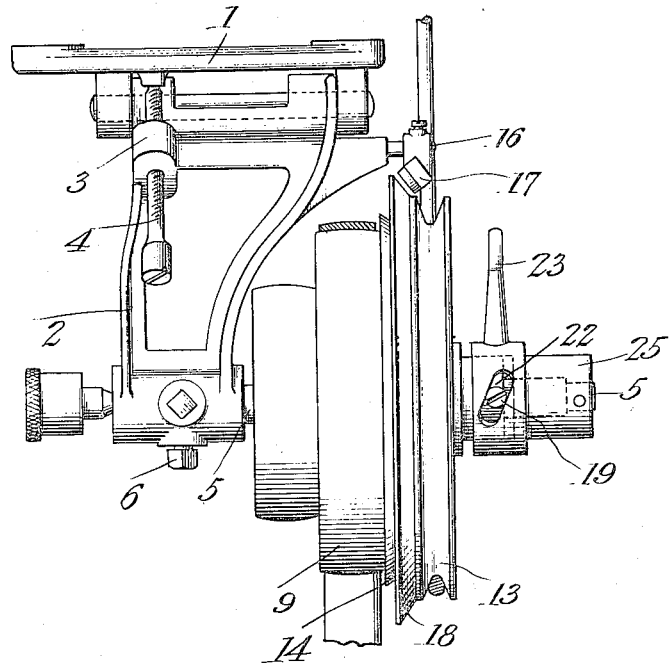
Figure 2:
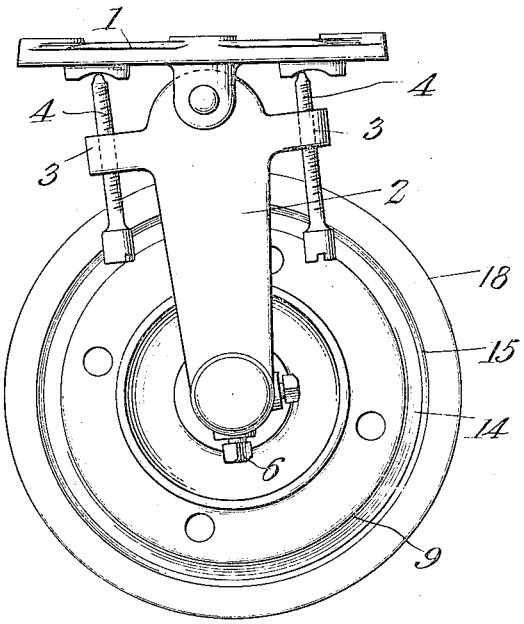

In the drawings which show by way of illustration one embodiment of the invention, Figure 1 is a side elevation of a transmitter embodying my improvements; Fig. 2 is an end view thereof; Fig. 3 is a vertical sectional view longitudinally of the transmitter; Fig. 4 is an end view of the driven member, the stationary brake and the sleeve for shifting the driven member; and Fig. 5 is a sectional view through the sleeve, also showing on a smaller scale, the treadle for operating the same.

In carrying out my invention, I have provided a base plate 1, which is adapted to be screwed to the under side of a table or attached in any desired way, so as to support the parts of the transmitter. Pivoted to the supporting base 1 is a bracket 2, on which the parts of the transmitter are mounted. Said bracket is provided with laterally projecting lugs 3, 3, which carry adjusting screws 4, adapted to engage the base plate, and to hold the bracket 2 in a predetermined adjusted position relative to the base plate. The purpose of this adjustment is to allow for the swinging of the transmitter, in order to tighten the belt, or for any other purpose. Mounted in the bracket 2 is a laterally projecting rod 5. Said rod is secured to the bracket by a set screw 6. Mounted on the rod 5 adjacent the bracket 6 is a sleeve 7, which is formed in two parts and with hardened cones constructed so as to afford a bearing seat or runway for balls.

Coöperating with the sleeve 7 is a second sleeve 8, which is also provided with a runway or raceway for the balls. These two sleeves, together with the balls, form a ball bearing. The sleeve 7 is fixedly attached to the rod 5, in any desired way.

A driving pulley 9 is fixed to the outer sleeve 8, and rotates on the balls relative to the inner sleeve. This driving member will be held against longitudinal movement on the rod 5.

Splined to the rod 5 is a second sleeve 10, which is also made in two parts which are threaded together. This sleeve is provided with hardened runways for a series of balls, and a sleeve 11 is mounted on the first named sleeve 10. Said second sleeve 11 is also formed with runways for the balls. A driven pulley 12 is fixedly attached to the sleeve 11, and is supported on said sleeve 10 through the ball bearing connections above referred to. The driving pulley 9, as herein shown, is formed to receive a belt, and is also formed for two different speeds. This driving pulley may, however, be made of any desired well known shape. The driven pulley is formed with a groove 13, to receive the ordinary round driving belt. The driving member 9 is formed with a friction surface 14, which is opposed to the friction surface 15 on the driven member 12.

The sleeve 10, as above noted, may slide freely on the rod 5, and if moved in the proper direction will shift the driven member 12, so as to bring the friction surfaces 14 and 15 into driving contact. If the sleeve 10 be moved in the opposite direction, said surfaces will be separated so as to free the driven member from the driving member.

Attached to the bracket 2 is a stud 16, carrying a brake shoe 17. This brake shoe is disposed relative to the driving member 12, so that when the sleeve 10 is moved longitudinally on the rod 5, the friction surfaces 14 and 15 are separated, and the outer flanged surface 18 of the driving member 12 will be brought into contact with the brake shoe 17.

As a means for moving the sleeve positively in both directions, I have extended said sleeve beyond the hub of the driven member 12, and threaded into the same a screw stud 19, see Figs. 1 and 5. On the screw stud 19 is a roller 20. A sleeve 21 engages over the projecting sleeve 10, and is formed with an inclined or cam slot 22, see Fig. 1, and also with a projecting arm 23. Said sleeve at the other side is reduced so as to form a collar 24 that fits freely on the rod 5. A stop sleeve 25 is mounted on the end of the rod 5 and secured thereto by a set screw 26. Said stop sleeve 25 is bored, so as to receive a spring 27 which encircles the collar 24. Said spring 27 is a coiled spring, and has one end thereof engaged in a recess formed in the stop collar 25, and the other end thereof engaged in a recess formed in the sleeve 21. Said spring is placed under the proper tension, so as to tend to rotate the sleeve 21 relative to the stop collar 25, in the direction indicated by the arrow in Fig. 5.

The rod 5 is provided with a shoulder 28, which holds the sleeve 10 from longitudinal movement on the rod 5. Therefore, as the sleeve is rotated in the direction of the arrow, the same slot 22 engaging the roller 20 on the sleeve 10, will move said sleeve on the rod 5 and bring the driving pulley 12 into contact with the brake shoe.

As a means for rotating the sleeve 10 against the tension of the spring 27, I have provided a treadle 29, which is connected through a link 30 with the arm 23, attached to the sleeve 10. By depressing the treadle 29, the sleeve 10 will be moved in a direction opposite to that indicated by the arrow in Fig. 5, and the cam slot 22 will shift the driving pulley 12, so as to bring the frictional driving surfaces into driving contact.

It will thus be seen that the collar 10 positively shifts the driven pulley 12, first in one direction and then in the other, and that the spring 27 normally holds the driven pulley in contact with the stationary bracket.

It is obvious that many minor changes in the details of construction may be made, without departing from the spirit of my invention.

Having thus described my invention, what I claim as new and desire to secure by Letters Patent, is:—

1. A power transmitter including in combination, a driving member, a driven member, said members having opposed friction surfaces, a non-rotating sleeve on which said driven member is rotatably mounted, said sleeve having means for preventing lateral movement of said driven member on said non-rotating sleeve, means for shifting said sleeve to move said driven member laterally, said means including a second sleeve having a cam slot therein, a stud carried by said first named sleeve and engaging said cam slot, a spring for rotating said sleeve in one direction, and a treadle connection for rotating the sleeve in the opposite direction.

2. A power transmitter including in combination, a supporting bracket, a rod fixed to said bracket and projecting therefrom, a driving member, a sleeve fixed on said rod and having a ball bearing support for said driving member, a second sleeve splined to said rod, a driven member carried by said second sleeve, a ball bearing support on said second sleeve, said driven and driving members having opposed friction surfaces, means for moving said second sleeve longitudinally of said rod, including a third sleeve having a cam slot therein, a roller stud carried by said second sleeve and engaging said cam slot, a spring for rotating said third sleeve on said supporting rod, means for preventing said third sleeve from moving longitudinally of said rod, and means whereby said sleeve may be rotated against the tension of said spring for bringing said friction surfaces into driving contact.

3. A power transmitter including in combination, a supporting bracket, a rod fixed to said bracket and projecting therefrom, a driving member, a sleeve fixed on said rod and having a ball bearing support for said driving member, a second sleeve splined to said rod, a driven member carried by said second sleeve, a ball bearing support on said second sleeve, said driven and driving members having opposed friction surfaces, means for moving said second sleeve longitudinally of said rod, including a third sleeve having a cam slot therein, a roller stud carried by said second sleeve and engaging said cam slot, a spring for rotating said third sleeve on said supporting rod, means for preventing said third sleeve from moving longitudinally of said rod, means whereby said sleeve may be rotated against the tension of said spring for bringing said friction surfaces into driving contact, and whereby the rotation of said sleeve under the action of the spring will cause said friction surfaces to be disengaged.

4. A power transmitter including in combination, a bracket, a stationary supporting stud carried thereby, a driving member, a driven member, said driving and driven members being mounted to rotate on said stud, a cam mounted to turn on said stud, devices coöperating with said cam for bringing the driving and driven members into contact and for releasing the same, an arm connected with the cam for moving said cam in one direction for bringing the driving and driven members into contact and for moving said cam in the opposite direction to release the driving and driven members.

5. A power transmitter including in combination, a bracket, a stationary supporting stud carried thereby, a driving member, a driven member, said driving and driven members being mounted to rotate on said stud, a cam mounted to turn on said stud, devices coöperating with said cam for bringing the driving and driven members into contact and for releasing the same, an arm connected with the cam for moving said cam in one direction for bringing the driving and driven members into contact and for moving said cam in the opposite direction to release the driving and driven members, a spring for moving the cam and arm in one direction, and a treadle for moving the cam and arm in the opposite direction against the tension of said spring.

6. A power transmitter including in combination, a bracket, a stationary supporting stud carried thereby, a driving member, a driven member, said driving and driven members being mounted to rotate on said stud, a cam mounted to turn on said stud, devices coöperating with said cam for bringing the driving and driven members into contact and for releasing the same, an arm connected with the cam for moving said cam in one direction for bringing the driving and driven members into contact and for moving said cam in the opposite direction to release the driving and driven members, a spring for moving the cam and arm in one direction, and a treadle for moving the cam and arm in the opposite direction against the tension of the spring, and means for varying the tension of said spring.

7. A power transmitter including in combination, a driving member, a driven member, said members having opposed friction surfaces, a stationary supporting stud on which said driving and driven members are mounted to rotate, a non-rotating sleeve carried by said stationary stud for supporting one of said rotating members, balls between the sleeve and the supporting member, a bracket on which said supporting stud is mounted, a cam mounted to turn on said stationary stud, an arm connected with the cam for moving the same in one direction for bringing the driving and driven members into contact, and for moving the cam in the opposite direction to release said driving and driven members, a spiral spring for moving the cam and arm in one direction, and a treadle for moving the cam and arm in the opposite direction against the tension of said spring.

In testimony whereof I affix my signature in presence of two witnesses.

DUDLEY S. SEYMOUR.

Witnesses:
C. McNeil,
A. B. Clothier.